United States Patent
Carpenter et al.

[11] Patent Number: 5,989,336
[45] Date of Patent: Nov. 23, 1999

[54] CEMENT COMPOSITION

[75] Inventors: Robert B. Carpenter, Allen; J. Benjamin Bloys, Plano; David L. Johnson, Dallas, all of Tex.

[73] Assignee: Atlantic Richfield Company, Los Angeles, Calif.

[21] Appl. No.: 08/889,678

[22] Filed: Jul. 8, 1997

[51] Int. Cl.$^6$ .............................. C04B 14/10; E21B 33/13
[52] U.S. Cl. ...................... 106/811; 106/718; 106/719; 106/803; 106/819; 106/823
[58] Field of Search ..................... 106/811, 718, 106/719, 802, 803, 819, 823

[56] References Cited

U.S. PATENT DOCUMENTS

| | | | |
|---|---|---|---|
| 3,563,313 | 2/1971 | Spangle | 166/292 |
| 3,936,383 | 2/1976 | Daimon et al. | 106/600 |
| 4,176,720 | 12/1979 | Wilson . | |
| 4,216,022 | 8/1980 | Wilson . | |
| 4,276,182 | 6/1981 | Beirute . | |
| 4,322,301 | 3/1982 | Blackmore . | |
| 4,342,866 | 8/1982 | Kang et al. . | |
| 4,374,738 | 2/1983 | Kelley . | |
| 4,415,367 | 11/1983 | Nelson | 106/718 |
| 4,423,781 | 1/1984 | Thomas . | |
| 4,717,488 | 1/1988 | Seheult et al. . | |
| 4,778,528 | 10/1988 | Defosse | 106/803 |
| 4,883,125 | 11/1989 | Wilson et al. . | |
| 4,888,120 | 12/1989 | Mueller et al. | 507/227 |
| 4,892,898 | 1/1990 | Leighton et al. . | |
| 4,953,620 | 9/1990 | Bloys et al. . | |
| 4,976,316 | 12/1990 | Carpenter et al. . | |
| 5,005,646 | 4/1991 | Bloys et al. . | |
| 5,027,900 | 7/1991 | Wilson . | |
| 5,030,366 | 7/1991 | Wilson et al. . | |
| 5,038,863 | 8/1991 | Bloys et al. . | |
| 5,101,902 | 4/1992 | Parcevaux et al. . | |
| 5,113,943 | 5/1992 | Wilson et al. . | |
| 5,221,489 | 6/1993 | Bloys et al. . | |
| 5,287,929 | 2/1994 | Bloys et al. . | |
| 5,292,367 | 3/1994 | Bloys et al. . | |
| 5,316,083 | 5/1994 | Nahm et al. . | |
| 5,332,041 | 7/1994 | Onan et al. . | |
| 5,360,787 | 11/1994 | Bloys et al. . | |

FOREIGN PATENT DOCUMENTS

| | | |
|---|---|---|
| 0171999 | 2/1986 | European Pat. Off. . |
| 0271784 | 6/1988 | European Pat. Off. . |
| 03093660 | 4/1991 | European Pat. Off. . |
| 0590983 | 4/1994 | European Pat. Off. . |
| 2296713 | 7/1996 | United Kingdom . |
| 96 20899 | 7/1996 | WIPO . |

OTHER PUBLICATIONS

"Development of a Unique Low Solids, High Density Drilling Fluid System" Apr. 1996 Dobson et al.

*Primary Examiner*—Anthony Green
*Attorney, Agent, or Firm*—William C. Long

[57] ABSTRACT

A cement slurry composition suitable for well bore cementation is provided containing as an essential component a synthetic hectorite clay in amount sufficient to reduce free water formation and solids segregation.

15 Claims, 2 Drawing Sheets

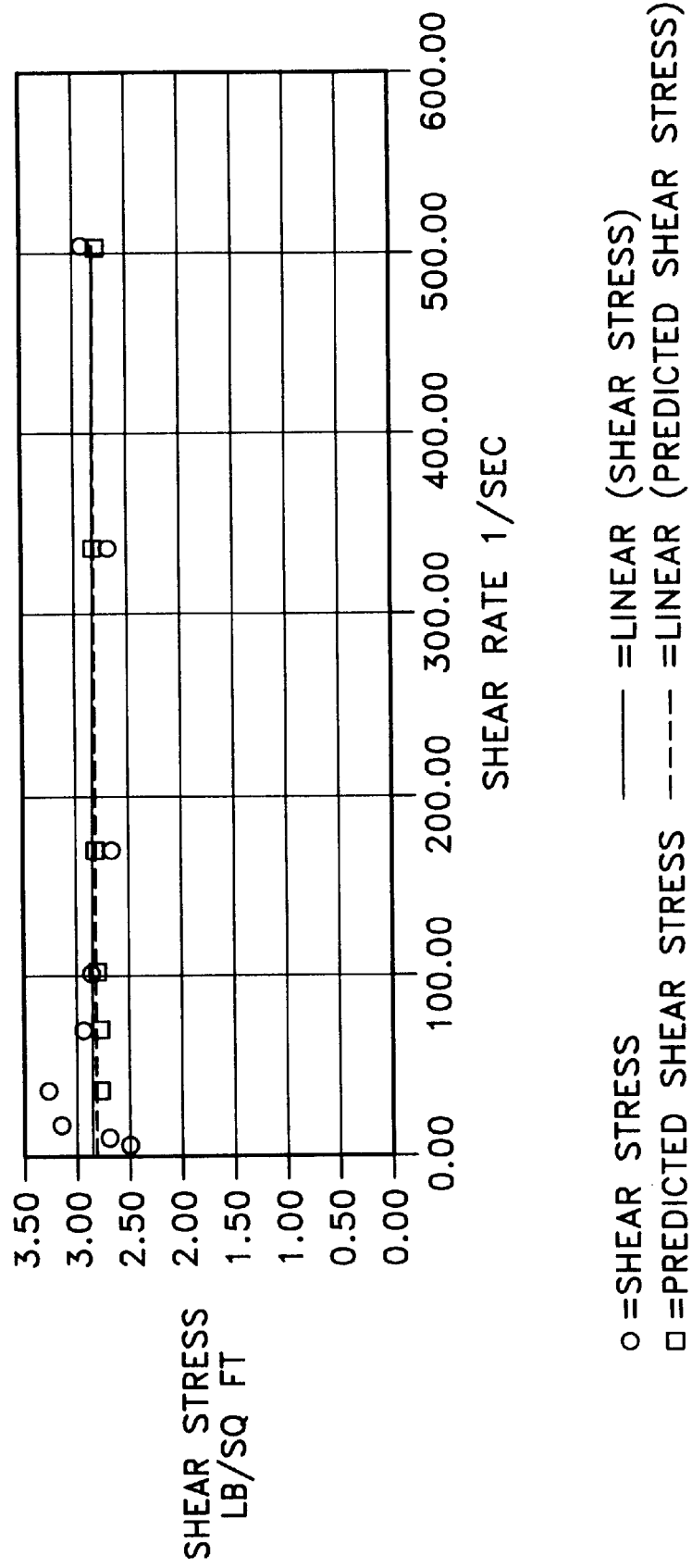

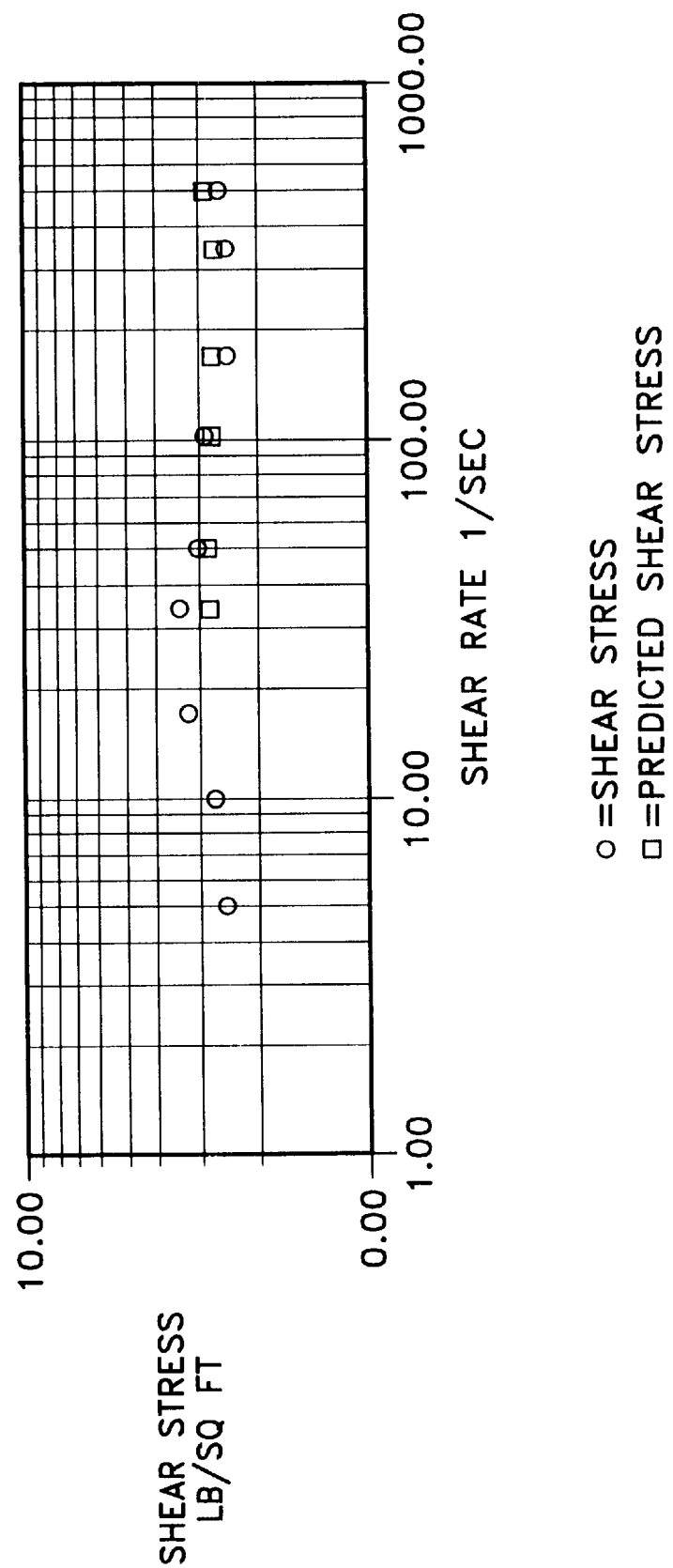

CEMENT COMPOSITION

FIELD OF THE INVENTION

The present invention relates to relatively flat rheology cement formulations especially adapted for well bore cementations which have substantially reduced free water development, solids segregation properties and enhanced displacement efficiency by virtue of the synergistic incorporation therein of a high surface area layer structured synthetic magnesium silicate hectorite clay, and in preferred forms, a combination of said hectorite clay and certain chemical additives; the formulations of which are capable of rapid and reversible gelling and exhibit viscosity characteristics that are relatively independent of shear rate. Relatively flat rheology designs that exhibit relatively high viscosities when measured at low shear rates, i.e., a "high low shear viscosity", but which have essentially no progressive gel strength development can be formulated that are particularly advantageous for primary cementing applications.

BACKGROUND OF THE INVENTION

Free water and solids segregation have long been identified as the source of many problems in well bore cementations. Many SPE publications have discussed the role of free water development and solids segregation in "gas-cutting" of cement and inter-zonal communication. This is a particular problem in deviated well bores where the solids and free water have only to move a few inches to collect. The water can then slide along the upper formation face and the solids downward along the lower formation face. Free water can also collect and form "open pockets" in well bore irregularities.

The industry's awareness of this problem has resulted in concerted efforts to control free water development and sedimentation. While the API has recently been active in developing a more stringent "Operating Free Water Test", several individual companies within the industry have already developed their own review criteria. Most include some physical/visual inspection, some further specify minimum yield point YP or Ty values since certain rheologic properties control cement slurry stability. These YP or Ty values represent an extrapolated y intercept, typically using the shear stress/shear rate relationships present at higher shear rates, such as 1022 to 170 reciprocal seconds. However, the actual y intercepts and low shear rate fluid rheology are typically much lower since most cement slurries fail to follow "ideal" Bingham Plastic or Power Law behavior. Cement slurries typically have actual shear stress values falling well below projected values in the shear rate range of from 1022 to 170 reciprocal seconds. As a result, the API suggests use of shear rates of from about 511 to 170 reciprocal seconds to minimize non-model behavior at low shear rates.

Cement slurries are a suspension of solids in water. The solids are suspended by the chemical and physical interactions of these particles. Unfortunately, most of the cement modifiers used for fluid loss control and for ensuring adequate pumping time reduce low shear viscosity or disperse the cement particles. AMPS co-polymers (acrylomido methyl propane sulfonate copolymers) are particularly notorious for reducing low shear viscosity, yield intercept and progressive gels. Cement dispersants, i.e. sodium naphthalene sulfonate condensed with formaldehyde, and retarders i.e. lignosulfonates and organic acids, strongly disperse the cement particles. This dispersion reduces cement viscosity at all shear levels and greatly reduces yield point and progressive gelation. Low shear viscosity, yield point, and progressive gel strength development are key to proper solids support and free water control. A material that would boost these values would be most beneficial.

Past work at addressing this problem has focused on three approaches. One uses a heat-activated gellant, another uses materials that preferentially increase yield point, and the third uses progressive gel strength development. Heat-activated or latent solubility polymers do not yield during initial surface mixing, but increase overall viscosity as they yield at higher temperatures. This permits higher viscosity than would otherwise be possible and offsets to some degree thermal thinning. The problem with this approach is that the organic polymers have an upper temperature limitation of 250–300° F. They also remain subject to thermal thinning. Therefore, to achieve adequate viscosity at 250° F., the viscosity and friction pressure will be greater than desired at <200° F.

Materials such as Kelco's Biozan, bentonite and attapulgite have been used to preferentially boost cement slurry yield point and low shear viscosity. While they do increase plastic viscosity and apparent viscosity at the higher shear rates, greater gains are made in the yield point and progressive gels. Unlike the temperature activated materials, the total usable concentration of these additives is limited by surface mixing viscosity.

U.S. Pat. No. 4,778,528 attempts to address the problem of free water formation and suggests the addition to cement slurry compositions of 100 micromols to 5 millimols per 100 grams of cement of a soluble salt of magnesium, tin, lead, bismuth or a transition metal, or a combination of these.

U.S. Pat. No. 4,888,120 relates to the use of synthetic swellable layer silicates in water-based well drilling fluids as a high temperature stable thixotrope which are said to be substantially unaffected by alkaline earth metal ions. The patent does not deal with cement compositions which contain synthetic swellable layer silicates.

Published UK patent application GB 2,296,713 and its counterpart WO 96/20899 describe synthetic hectorite/ cement mixtures which are said to be capable of rapid and reversible gelling.

SUMMARY OF THE INVENTION

In accordance with the present invention, the development of free water and solids segregation in well drilling cement slurries is substantially retarded by the incorporation in the cement slurry of an effective amount of a finely divided, synthetic hectorite clay. Especially preferred is the use of a predominantly Si/Mg smectite clay known as LAPONITE produced by Laporte of the United Kingdom. LAPONITE is a registered trademark of Laporte Absorbents. A further useful characteristic of the compositions of this invention is that they are capable of rapid and reversible gelling.

Accordingly, in one aspect, the invention relates to a cement slurry composition useful for cementing oil wells comprising cement and water together with synthetic hectorite clay in amount sufficient to reduce solids segregation and free water development.

In another aspect, the invention relates to a settable thixotropic material comprising a thixotrope and a settable substance, the material being capable of gelling reversibly in a gelling time of less than 60 seconds.

In a third aspect, the invention relates to a slurry composition comprising cement and water together with synthetic hectorite clay having a flat rheological shear stress versus shear rate curve.

In a fourth aspect, the invention relates to a cement slurry composition comprised of cement and water, and containing a synergistic combination comprised of a synthetic hectorite and at least one additive selected from chemical dispersants and phosphate compounds in amounts sufficient to substantially increase low shear viscosity and produce a relatively flat rheology curve, the 300/3 slope of which is 4 or less.

BRIEF DESCRIPTION OF THE DRAWINGS

FIGS. 1 and 2 are graphical plots of shear stress versus shear rate illustrating the relatively flat rheological curves achievable through the invention.

DESCRIPTION OF THE PREFERRED EMBODIMENTS

The cement slurry compositions of the present invention are comprised of the normal cement slurry components in addition to the synthetic hectorite clay, and more preferably the compositions are comprised of said normal cement slurry components together with a synergistic combination of the synthetic hectorite clay with selected phosphates and/or chemical dispersants. The normal cement components that can be employed in the present invention are known to those skilled in the art and typically comprise water; cement (which may be one or more of any cementitious material, such as Portland cement, magnesium oxide, calcium aluminate, and activated pozzolans or blast furnace slags); extenders such as bentonite, pozzolan, and blast furnace slag, and fly ash; retarders such as lignosulfonate and organic acids; accelerators such as calcium chloride or sodium chloride; and water-loss reducing agents such as AMPS copolymers, polyamines, and cellulose derivatives.

Critical to practice of the invention is the incorporation of the synthetic hectorite clay in an effective amount in the cement slurry. The synthetic hectorite is added first to the water used in forming the slurry or blended with water to form a liquid concentrate containing about 2–10% by weight of the synthetic hectorite.

A preferred synthetic hectorite clay for use in the invention is LAPONITE RD which is a free flowing synthetic layered silicate having illustrative characteristics of a bulk density of 1,000 kg/m$^3$, a surface area (BET) of 370 m$^2$/g, a pH of a 2% suspension in water of 9.8. The composition on a dry basis by weight is 59.5% $SiO_2$, 27.5% MgO, 0.8% $Li_2O$, and 2.8% $Na_2O$. Loss on ignition is 8.2%.

Another synthetic hectorite which is especially useful is LAPONITE RDS which incorporates an inorganic polyphosphate peptizer. This synthetic hectorite is also a free flowing synthetic layered silicate illustratively having a bulk density of 1,000 kg/m$^3$, a surface area (BET) of 330 m$^2$/g, a pH of a 2% suspension in water of 9.7. The composition on a dry basis by weight is 54.5% $SiO_2$, 26.0% MgO, 0.8% $Li_2O$, 5.6% $Na_2O$, and 4.1% $P_2O_5$. Loss on ignition is 8.0%.

Still another preferred synthetic hectorite is LAPONITE JS. This material has incorporated therewith still further amounts of inorganic polyphosphate peptizers compared with LAPONITE RDS. Otherwise the composition is the same.

The particle size of the synthetic hectorites is extremely fine, about 250 Angstroms in average diameter.

The synthetic hectorite clay additives used in practice of the invention have the unique ability to provide strong shear thinning and thixotropic characteristics to a cement slurry. Unlike organic polymers, synthetic hectorite clays do not thermally degrade or retard cement set time. Those cement designs which have the synthetic hectorite clays sheared into the cement mix water prior to adding the dry cement exhibit an immediate yield. Inorganic salts, organic dispersant and mixing order can be adjusted to optimize rheological properties as illustrated in the tabular data presented hereinafter. The synthetic hectorite additives provide solids support and free water control and rheological characteristics superior to existing technology while controlling friction pressure.

A difficult task in well cementing is establishing a complete and uniform displacement of drilling fluid from the well bore. Virtually all elements of the "real" downhole environment work against this end. Fluid loss from the drilling fluid (mud) produces localized pockets of higher viscosity mud. Also, at any given shear rate (short of turbulent flow), the less viscous fluid will tend to channel or finger through the more viscous fluid. At low shear rates, the apparent viscosity of most cement designs is lower than that of the mud. In a concentric annulus, we can avoid this problem to some degree by pumping the fluids at higher rates. At higher shear rates, the cement generally has a greater apparent viscosity than the mud and drag forces are also increased. Unfortunately, the pump rates required to achieve a high annular shear rate are not always practical.

The disparity between fluid viscosity at low shear rates is further compounded in that the fluid returning to the surface is believed not to be representative of all the fluid in the well bore. Work by other authors and field observations have shown that the effective well bore diameter (flow channel) effectively increases when the input flow rate is increased, up to the point of 100% annular movement. This would infer that the last fluid (mud) fraction to be mobilized had a viscosity significantly higher than that circulated to the surface while circulating at the lower rates. Therefore, to ensure removal of this fluid fraction substantially greater fluid force, viscosity and rate is needed than would be deduced if looking only at the rheology of the fluid collected at the surface at low (typical) pump rates. The practice of collecting the fluid sample during drilling also brings about an under-estimation of fluid force needed for efficient displacement. The drilling fluid almost always experiences a prolonged period of little flow and fluid maintenance while drilling pipe is being placed within the well bore. During this period the fluid tends to gel and dehydrate thereby making it much more difficult to displace from the well bore. The drilling fluid is seldom returned to a fully circulating fluid column before cementation of the annulus is attempted.

Displacement is particularly hindered by the fact that the pipe is generally poorly centered, i.e., it has an eccentric annulus. In an eccentric annulus, the displacing fluid, be it spacer or cement, can experience a wide range of shear rates due to variation of the annular width. The fluids tend take the path of least resistance and preferentially flow within such path. Thus, the fluid tends to travel or "channels" through the wide side of the eccentric annulus where the overall shear level is lower. This helps defeat the above mentioned efforts, while creating further problems. Since the fluid will travel faster on the wide side of the annulus, complete cement coverage within the annulus throughout the well bore may not be achieved before completion of the pumping of a fixed volume of cement. Also, since the flow path will generally spiral around the pipe, mud pockets are prone to form.

A related problem, displacement of drilling fluid from well bore wash-outs, is also widely documented. Here again, when the velocity (shear rate) and relative shear stress for the cement and spacer fluid drop in the enlarged well bore section, it is more difficult to displace the mud. The cross-sectional area in these enlarged sections of the well bore can be several orders of magnitude greater than the predominate or designed annulus. Fluid flow through these sections will be at much lower shear rates and generally the annulus will also be more eccentric since the well bore diameter is often outside the maximum effective range for casing centralizers.

A high N', plastic viscosity, or 300/3 slope values and high degree of "thermal thinning" normally present in spacer and cement fluids limit available down hole viscosity, particularly at elevated temperatures and low shear rates. Before adequate viscosity at the lower shear rates can be obtained high shear rheology as apparent viscosity is too great to permit mixing and pumping at the surface, particularly at the high shear rates needed for timely and effective displacement. Historically, even very viscous spacer and cement designs exhibit relatively little viscosity at low shear rates at elevated temperatures. This is another reason why greater displacement efficiency has been observed at high pump rates.

Typically, one or more, often all rheological factors are working against efficient mud displacement. Thus, pockets of non-displaced mud are generally left within the annulus at the end of displacement. Cement bond logs have repeatedly demonstrated poor displacement efficiency in well bore wash-outs and intervals without effective centralization. As noted above, high displacement rates help many of these problems, but in most field applications, pump capacity, formation fracture gradients, and annular eccentricity limit the effectiveness of this approach. Even when relatively high pump rates can be utilized, cement evaluation logs typically show a good cement sheath only in areas of good centralization and gauge hole.

The thermal thinning and low shear viscosity exhibited by most cement and spacer designs promote sedimentation of solids and cement free water development. A fluid must either develop enough gel strength to support solids, control sedimentation and free water, or possess elevated low shear rate viscosity. In deviated or horizontal well bores, problems with solids support and free water development become much more difficult and at the same time more critical. The more nearly horizontal the well bore, the shorter the distance for coalescence. The high density fraction (solids) can quickly build-up on the bottom of the well bore and the water at the top.

A free water channel along the top axis of a high angle well is a future conduit for annular communication. In high density cement designs, the incorporation of dense weighing materials can promote density stratification and the resultant poor distribution or loss of hydrostatic forces. When these high density materials settle out of the carrier fluid, annular bridging and gas or water influx can result. The result can be disastrous, as well as difficult and expensive to repair. An "ideal" flat rheology fluid would have an N' slope or Plastic Viscosity approaching zero and a 300/3 slope approaching 1. It would therefore exhibit the same resistance to flow across a broad range of shear rates and more ideally limit thermal thinning, particularly at low shear rates. A 300/3 slope calculation as an "easier" calculation for characterization of "flat rheology" fluid behavior has been used. This slope is defined as: 300 rpm shear stress/3 rpm shear stress when using a B1 bob and R1 sleeve rotation viscometer. The greater the resultant slope value the more prone the fluid is to channeling in an eccentric annulus and none of the annuli are ever perfectly centered. In fact, most are more eccentric than generally recognized. Typically, cement slurries and most spacers exhibit a 300/3 slope of 8–10 or an N' of 8–1.0, and Plastic Viscosities ranging from 100–300 depending upon which shear rates are used for calculating the properties. The present invention places more emphasis on the shear rates below 60 $s_1$ (reciprocal seconds). Many calculations of N' do not include these lower shear rate values for calculation of N'. They are excluded because they typically fall below the values that would be mathematically predicted by Bingham Plastic and Power Law modeling. Slopes (300/3) of 1–4, N' values of <0.6 and Plastic Viscosities from 0–206 p are achieved with the formulations described by this invention which provide lower values across a broad range of shear and temperature.

The flat rheology fluids of the present invention are not as adversely affected by poor centralization since they more nearly exhibit the same resistance to flow across the whole of the annulus. Accordingly, mud displacement is a matter of ensuring that the spacer and cement are more viscous than the mud at the maximum shear rate and that the different fluids are chemically compatible. Fluids of this type would work better at the relatively low shear rates typical of most cement jobs.

The flat rheology fluids of the invention provide excellent support of solids and essentially no free water development. Cements of this nature are very useful for inflating cement filled packers. Flat rheology fluids are also useful for wellbore clean-out or sweeps during drilling and completion operations or anywhere where a clean, even interface is essential to displacement success. In general, the use of the synthetic hectorite clays in an amount of from about 0.1 to 4 wt % based on cement, and preferably from about 0.5 to 2 wt % based on cement, is suitable although amounts outside these ranges can be used.

Conventional slurry blending techniques can be employed as can conventional cement slurry additive components can be used.

Like the materials described in GB 2296713, the synthetic hectorite and cement slurries of this invention are capable of rapid and reversible gelling. Gel times of less than 60 seconds, preferably less than 30 seconds and more preferably less than 10 seconds can be achieved under static conditions.

Gel shear yield stress of at least 100 Pascal (Pa) up to 500 Pa or more are developed in the gelling time; the materials of this invention reach substantially maximum gel strength (at least 90%) within the gelling time and maintain this value until setting has started.

The following examples illustrate the invention:

A series of cement slurries each having a density of 15.7 pounds per gallon were formed with API class H Portland cement. In each case except Tests 38 and 54, the slurry contained 46% water based on the weight of dry cement. The Test 54 slurry contained 55% water based on cement and the Test 38 slurry comprised 36.61% seawater and 8.68% fresh water based on cement. Unless otherwise indicated, deionized water was used. The various blends were tested to determine various rheological properties at various temperatures; free water was measured. The following Table 1 describes the compositions of the various mixtures and the test results. In the Table, amounts of the additives including water are expressed as weight percent based on dry cement. The rheological parameters indicated in the Table, including plastic viscosity (PV) indicated in centipoises and yield point (YP) indicated in pounds per hundred feet squared, were measured with a Model 35 Fann viscometer utilizing a #1 bob and sleeve and a #1 spring. A Fann viscometer uses a rotor and a bob which is attached to a spring, to measure the shear stress factor in a fluid. The bob and rotor are immersed in the fluid which is contained in a stationary test cup. The rotor, arranged in concentric alignment with the bob, causes the fluid to move at various shear rates, while the bob by means of the attached spring, measures the torque exerted on itself. Slope 300/3 is defined as 300 rpm shear stress/ 3 rpm shear stress using the bob and sleeve rotation viscometer and is a convenient representation of the slope of the rheological curve. In the Table, the values 600, 300, 200, 100, 60, 30, 20, 10, 6, 3, 2 and 1 under Rheology are RPM's at which the indicated measurements were taken and the values below are the viscosimeter measurements.

TABLE 1

| No. | Additives % | Temp °F. | \multicolumn{12}{c|}{Rheology} | | | | | | | | | | | | | | PV | YP | FW ml | SLOPE 300/3 |
|---|---|---|---|---|---|---|---|---|---|---|---|---|---|---|---|---|---|---|
| | | | 600 | 300 | 200 | 100 | 60 | 30 | 20 | 10 | 6 | 3 | 2 | 1 | | | | |
| | | 72 | 74 | 44 | 34 | 26 | 22 | 19 | 17 | 15 | 14 | 11 | 10 | 9 | 27.7 | 17.3 | | 4 |
| 1 | None | 125 | 89 | 82 | 68 | 55 | 49 | 40 | 35 | 21 | 16 | 12 | 10 | 10 | 43.7 | 40.8 | 3.6 | 6.833 |
| | | 75 | 76 | 49 | 40 | 31 | 26 | 22 | 20 | 17 | 15 | 11 | 9 | 8 | 30.2 | 20.7 | | 4.667 |
| 2 | 0.5 RD | 125 | 87 | 73 | 60 | 49 | 42 | 36 | 32 | 20 | 15 | 10 | 9 | 8 | 39.7 | 35.8 | 4.8 | 7.3 |
| 5 | 0.5 RD | RT | 82 | 56 | 47 | 36 | 31 | 27 | 25 | 22 | 18 | 12 | 10 | 7 | 32.1 | 26.2 | — | 4.667 |
| | | 125 | 110 | 90 | 75 | 64 | 56 | 49 | 43 | 25 | 16 | 8 | 6 | 6 | 57.7 | 55.8 | — | 11.25 |
| | | 80 | 83 | 56 | 45 | 34 | 29 | 25 | 23 | 20 | 17 | 12 | 10 | 8 | 34.0 | 23.5 | — | 4.667 |
| 6 | 0.5 RD | 125 | 110 | 94 | 75 | 61 | 55 | 47 | 41 | 25 | 18 | 12 | 9 | 9 | 49.7 | 46.3 | 3.7 | 7.833 |
| | | RT | 85 | 58 | 48 | 38 | 33 | 28 | 26 | 23 | 18 | 12 | 9 | 7 | 32.3 | 27.8 | — | 4.8 |
| 20 | 0.5 RDS | 125 | 124 | 100 | 85 | 72 | 64 | 54 | 45 | 27 | 19 | 13 | 10 | 10 | 48.0 | 56.3 | 3.7 | 7.7 |
| | | RT | 89 | 66 | 55 | 43 | 37 | 32 | 30 | 26 | 18 | 12 | 10 | 8 | 37.2 | 31.4 | — | 5.5 |
| 21 | 0.5 JS | 125 | 127 | 110 | 94 | 79 | 70 | 58 | 43 | 26 | 16 | 10 | 7 | 7 | 54.1 | 60.9 | — | 11.0 |
| | | RT | 44 | 20 | 14 | 7 | 6 | 6 | 6 | 5 | 4 | 4 | 3 | 3 | 16.5 | 3.2 | — | 5 |
| 8 | 0.25 CFR2 0.5 RD | 125 | 39 | 21 | 16 | 12 | 12 | 12 | 12 | 11 | 10 | 8 | 8 | 7 | 10.4 | 10.5 | 29 | 2.625 |
| | | RT | 94 | 67 | 55 | 43 | 37 | 33 | 30 | 28 | 24 | 18 | 14 | 11 | 37.5 | 31.6 | — | 3.7 |
| 17 | 0.25 CFR2 0.5 RDS | 125 | 97 | 85 | 71 | 56 | 50 | 44 | 40 | 33 | 24 | 14 | 11 | 9 | 44.9 | 43.1 | 2.5 | 6.1 |
| | | RT | 105 | 74 | 60 | 47 | 41 | 36 | 34 | 31 | 25 | 19 | 15 | 11 | 41.5 | 34.6 | — | 3.9 |
| 18 | 0.25 CFR2 0.5 JS | 125 | 94 | 78 | 66 | 54 | 47 | 43 | 40 | 32 | 25 | 17 | 14 | 12 | 38.6 | 42.4 | 2.5 | 4.6 |
| | | RT | 100 | 75 | 62 | 50 | 44 | 39 | 37 | 33 | 25 | 18 | 14 | 10 | 39.1 | 38.3 | — | 4.2 |
| 19 | 0.25 CFR2 0.5 JS | 125 | 120 | 99 | 83 | 68 | 60 | 53 | 48 | 36 | 38 | 20 | 17 | 14 | 49.7 | 52.9 | 2.3 | 5.0 |
| | | RT | 83 | 58 | 49 | 38 | 33 | 30 | 29 | 28 | 27 | 25 | 19 | 16 | 31.4 | 28.9 | — | 2.3 |
| 34 | 0.5 CFR2 0.5 JS | 125 | 71 | 55 | 49 | 40 | 37 | 34 | 33 | 31 | 28 | 21 | 18 | 15 | 23.5 | 34.3 | 1.9 | 2.6 |
| | | RT | 56 | 32 | 24 | 16 | 12 | 10 | 9 | 9 | 9 | 10 | 10 | 10 | 24.6 | 8.0 | — | 3.2 |
| 35 | 1.0 CFR2 0.75 RD | 125 | 47 | 25 | 20 | 14 | 11 | 10 | 9 | 10 | 10 | 13 | 13 | 13 | 17.1 | 8.6 | 0.2 | 1.9 |
| | | RT | 118 | 75 | 56 | 40 | 33 | 27 | 25 | 22 | 17 | 12 | 9 | 7 | 52.3 | 23.5 | — | 6.25 |
| 9 | 0.25 CFR2 0.75 RDS | 125 | 125 | 97 | 79 | 64 | 53 | 45 | 40 | 30 | 22 | 15 | 11 | 10 | 55.7 | 44.6 | 1.8 | 6.467 |
| | | RT | 97 | 59 | 45 | 33 | 28 | 24 | 22 | 20 | 17 | 13 | 11 | 9 | 38.3 | 21.4 | — | 4.538 |
| 10 | 0.25 CFR2 0.75 JS | 125 | 139 | 104 | 95 | 75 | 62 | 53 | 45 | 34 | 25 | 17 | 15 | 13 | 56.6 | 55.0 | 1.8 | 6.118 |
| | | RT | 128 | 95 | 78 | 63 | 55 | 50 | 46 | 39 | 32 | 21 | 17 | 14 | 49.4 | 48.4 | — | 4.524 |
| 11 | 0.25 CFR2 | 125 | 155 | 129 | 110 | 92 | 79 | 67 | 59 | 41 | 31 | 25 | 21 | 20 | 65.7 | 69.3 | 1.3 | 5.16 |
| 12 | 0.5 CFR2 | RT | 40 | 16 | 10 | 5 | 3 | 2 | 2 | 1 | 1 | 1 | 1 | 1 | 15.6 | 0.0 | — | 16.0 |
| | | 125 | 31 | 13 | 7 | 4 | 3 | 2 | 2 | 1 | 1 | 1 | 1 | 1 | 11.8 | 0.4 | — | 13.0 |
| | 0.75 RD | RT | 143 | 100 | 82 | 65 | 55 | 48 | 45 | 42 | 33 | 27 | 22 | 18 | 56.7 | 46.7 | | 3.704 |
| 13 | 0.5 CFR2 0.75 RDS | 125 | 138 | 112 | 97 | 82 | 74 | 67 | 62 | 49 | 39 | 27 | 22 | 18 | 48.7 | 68.1 | 1.1 | 4.1 |
| | | RT | 122 | 91 | 79 | 65 | 57 | 54 | 50 | 47 | 41 | 31 | 26 | 21 | 41.9 | 53.1 | — | 2.9 |
| 14 | 0.5 CFR2 0.75 RDS | 125 | 143 | 115 | 104 | 89 | 80 | 73 | 67 | 56 | 45 | 34 | 30 | 28 | 45.9 | 75.6 | 0.8 | 3.4 |
| | | RT | 138 | 102 | 84 | 67 | 59 | 54 | 51 | 47 | 38 | 29 | 23 | 18 | 53.1 | 51.9 | — | 3.5 |
| 16 | 0.5 CFR2 0.75 JS | 125 | 114 | 96 | 85 | 73 | 67 | 63 | 60 | 51 | 42 | 30 | 26 | 23 | 36.5 | 63.8 | — | 3.2 |
| | | RT | 132 | 102 | 87 | 74 | 66 | 62 | 59 | 52 | 45 | 33 | 28 | 24 | 44.1 | 61.6 | — | 3.1 |
| 15 | 0.5 CFR2 0.75 RD | 125 | 141 | 119 | 108 | 94 | 85 | 80 | 74 | 63 | 51 | 39 | 37 | 31 | 43.3 | 82.3 | 0.9 | 3.1 |
| | | RT | 153 | 120 | 115 | 92 | 85 | 83 | 81 | 82 | 77 | 58 | 48 | 38 | 45.4 | 83.1 | — | 2.1 |
| 23 | 0.75 CFR2 0.75 RDS | 125 | 135 | 119 | 103 | 90 | 84 | 80 | 76 | 73 | 62 | 44 | 37 | 31 | 42.8 | 80.4 | 0.2 | 2.7 |
| | | RT | 121 | 93 | 81 | 70 | 67 | 66 | 66 | 69 | 67 | 58 | 52 | 47 | 30.8 | 65.2 | — | 1.6 |
| 24 | 0.75 CFR2 0.75 RDS | 125 | 112 | 92 | 81 | 72 | 69 | 67 | 66 | 66 | 57 | 48 | 45 | 42 | 27.7 | 67.5 | 0.3 | 1.9 |
| | | RT | 162 | 123 | 105 | 88 | 79 | 72 | 67 | 56 | 48 | 34 | 28 | 21 | 80.4 | 51.8 | — | 3.6 |
| 38 | 0.75 CFR2 | 125 | 124 | 102 | 89 | 75 | 69 | 64 | 60 | 50 | 40 | 28 | 24 | 20 | 41.9 | 64.4 | 1.1 | 3.6 |
| 30 | 0.75 JS | RT | 92 | 58 | 50 | 36 | 30 | 24 | 22 | 18 | 14 | 9 | 8 | 7 | 37.6 | 23.7 | — | 6.4 |
| | | 125 | 77 | 58 | 52 | 38 | 32 | 26 | 22 | 16 | 11 | 7 | 7 | 7 | 35.6 | 26.4 | 9.5 | 8.3 |
| | 0.75 JS | 125 | 117 | 97 | 89 | 78 | 74 | 70 | 68 | 63 | 50 | 37 | 34 | 30 | 30.0 | 72.2 | 0.5 | 2.6 |
| 25 | 0.75 CFR2 | | | | | | | | | | | | | | | | | |
| | 0.75 JS | RT | 93 | 64 | 55 | 47 | 42 | 42 | 43 | 52 | 51 | 48 | 46 | 44 | 25.4 | 40.8 | — | 1.3 |
| 33 | 1.0 CFR2 | 125 | 77 | 60 | 55 | 48 | 47 | 48 | 52 | 55 | 47 | 38 | 36 | 34 | 14.9 | 47.6 | 0.3 | 1.6 |
| | 0.75 JS | RT | 82 | 53 | 44 | 33 | 28 | 26 | 25 | 25 | 27 | 27 | 26 | 23 | 30.8 | 24.1 | — | 2.0 |
| 36 | 0.75 CFR2 0.2 HR5 | 160 | 58 | 44 | 38 | 32 | 31 | 33 | 36 | 41 | 39 | 34 | 30 | 27 | 13.9 | 31.1 | 0.2 | 1.3 |
| | 0.75 RDS | RT | 83 | 53 | 44 | 32 | 27 | 24 | 23 | 22 | 22 | 24 | 24 | 23 | 32.8 | 22.2 | — | 2.2 |
| 46 | 1.0 CFR2 0.2 HR5 | 160 | 56 | 36 | 30 | 25 | 23 | 23 | 24 | 27 | 31 | 31 | 30 | 30 | 15.0 | 21.8 | NR | 1.2 |
| | 0.75 JS | RT | 80 | 52 | 43 | 32 | 26 | 22 | 21 | 21 | 20 | 22 | 23 | 23 | 33.2 | 21.0 | — | 2.4 |
| 40 | 1.0 CFR2 0.2 HR5 | 160 | 60 | 46 | 42 | 37 | 38 | 42 | 48 | 50 | 49 | 46 | 48 | 43 | 7.0 | 40.2 | 0.2 | 1.0 |
| 44 | 0.75 JS | RT | 73 | 45 | 35 | 25 | 21 | 17 | 15 | 15 | 15 | 17 | 17 | 17 | 30.6 | 15.4 | — | 2.6 |
| | 1.25 CFR2 0.2 HR5 | 160 | 56 | 39 | 33 | 26 | 25 | 25 | 27 | 31 | 33 | 32 | 32 | 32 | 16.5 | 23.4 | NR | 1.2 |
| | 1.0 JS | RT | 132 | 105 | 91 | 83 | 79 | 80 | 83 | 86 | 83 | 65 | 59 | 47 | 28.5 | 79.3 | — | 1.6 |
| 39 | 0.75 CFR2 0.2 HR5 | 160 | 158 | 136 | 125 | 124 | 127 | 127 | 126 | 129 | 86 | 72 | 68 | 70 | 8.8 | 131.8 | 0.1 | 1.9 |
| | 1.0 JS | RT | 132 | 99 | 84 | 74 | 70 | 70 | 72 | 78 | 76 | 70 | 64 | 57 | 32.9 | 68.4 | — | 1.4 |

TABLE 1-continued

| No. | Additives % | Temp °F. | \multicolumn{12}{c}{Rheology} | PV | YP | FW ml | SLOPE 300/3 |
|---|---|---|---|---|---|---|---|---|---|---|---|---|---|---|---|---|---|---|
| | | | 600 | 300 | 200 | 100 | 60 | 30 | 20 | 10 | 6 | 3 | 2 | 1 | | | | |
| 41 | 1.0 CFR2 0.2HR5 | 160 | 108 | 104 | 95 | 102 | 108 | 97 | 101 | 102 | 102 | 100 | 100 | 98 | -0.2 | 107.9 | 0.1 | 1.0 |
| | 0.75 JS | RT | 202 | 154 | 131 | 117 | 96 | 93 | 92 | 92 | 90 | 78 | 63 | 52 | | 92.8 | — | 2.0 |
| 66 | 1.0 CFR2 0.1 HR5 | 190 | 190 | 153 | 138 | 122 | 114 | 112 | 110 | 117 | 91 | 64 | 55 | 46 | | 11.3 | — | 2.4 |
| | 0.75 JS | RT | 300+ | 270 | 240 | 225 | 206 | 188 | 171 | 144 | 105 | 78 | 59 | 42 | | 200 | — | 3.5 |
| 67 | 0.6 Hal 413 0.1 HR5 | 190 | 228 | 148 | 116 | 61 | 42 | 50 | 26 | 22 | 21 | 16 | 14 | 11 | | 28.7 | — | 9.3 |
| | 0.75 JS | RT | 300+ | 300 | 272 | 222 | 200 | 184 | 183 | 200 | 235 | 230 | 211 | 164 | | | | |
| 71 | 1.0 CFR2 0.1 HR5 0.4 Hal 413 0.4 Hal 344 | 190 | 300+ | 300 | 287 | 281 | 278 | 282 | 293 | 300+ | 294 | 230 | 195 | 151 | | 293 | — | 1.3 |
| | 0.75 | RT | 233 | 169 | 139 | 114 | 101 | 92 | 91 | 94 | 97 | 96 | 95 | 75 | | 89.7 | — | 1.8 |
| 72 | 1.0 CFR2 0.1 HR5 | 190 | 207 | 158 | 143 | 124 | 118 | 113 | 111 | 112 | 94 | 80 | 66 | 50 | | 114.8 | — | 2.0 |
| 73 | 1.0 CFR2 0.6 D112 0.1 HR5 | RT 190 | 300+ 218 | 300+ 142 | 250 114 | 172 81 | 141 66 | 113 54 | 111 52 | 109 53 | 109 | 110 73 | 111 74 | 111 66 | | 49.6 | — | 1.9 |
| 74 | 0.75 JS 1.0 CFR2 0.6 HAL 344 0.1 HR5 | RT 190 | 300+ 261 | 281 199 | 232 176 | 171 145 | 146 136 | 123 121 | 115 118 | 111 120 | 115 125 | 124 126 | 126 117 | 124 98 | | 117 124 | — — | 2.3 1.6 |
| 45 | 1.00 JS 1.25 CFR2 0.2 HR2 | RT 160 | 113 88 | 81 78 | 67 73 | 55 71 | 52 70 | 50 68 | 50 72 | 51 82 | 56 79 | 54 80 | 52 79 | 45 80 | 34.8 10.1 | 47.9 71.7 | 0.1 | 1.5 1.0 |
| 37 | 0.75 JS 0.75 CFR2 0.2 HR12 | RT 160 | 82 57 | 53 40 | 44 33 | 33 27 | 28 25 | 24 24 | 23 24 | 24 27 | 25 27 | 25 27 | 24 25 | 22 23 | 32.1 18.0 | 23.0 22.9 | — 9.2 | 2.1 1.5 |
| 43 | 0.75 JS 0.75 CFR2 0.2 Tartaric | RT 125 | 123 107 | 92 89 | 78 76 | 66 66 | 61 62 | 59 61 | 59 60 | 58 44 | 24 36 | 38 26 | 29 22 | 22 21 | 37.0 31.5 | 57.6 59.9 | — NR | 2.4 3.4 |
| 27 | 0.75 JS 0.2 Citric Acid | RT 125 | 52 90 | 25 67 | 18 53 | 11 39 | 9 33 | 7 28 | 6 24 | 6 17 | 5 12 | 4 9 | 4 7 | 4 5 | 19.96 42.84 | 5.1 25.8 | — 6 | 6.25 7.444 |
| 28 | 0.75 JS 0.2 Tartaric Acid | RT 125 | 58 54 | 31 31 | 23 27 | 16 22 | 13 19 | 10 16 | 9 14 | 8 12 | 7 10 | 7 8 | 6 7 | 5 7 | 22.73 16.08 | 8.64 16.59 | — — | 4.429 3.875 |
| 47 | 0.75 JS 1.00 CFR2 0.2 Hal 344 | RT 197 | 235 183 | 163 139 | 135 119 | 103 70 | 94 39 | 113 20 | 119 14 | 135 9 | 116 7 | 92 6 | 76 5 | 61 4 | 68.0 134 | 95.7 16.7 | — NR | 1.8 23.2 |
| 48 | 0.75 JS 1.0 CFR2 0.2 Hal 413 0.1 HR5 | RT 197 | 140 300+ | 100 200* | 83 130* | 68 75 | 63 44 | 65 34 | 71 27 | 89 22 | 90 17 | 87 15 | 86 12 | 82 11 | 41.4 185.0 | 60.4 11.9 | — NR | 1.1 13.3 |
| 49 | 075 JS 1.0 CFR2 0.2 Hal 344 0.1 HR5 | RT 197 | 187 162 | 125 143 | 104 128 | 84 117 | 76 110 | 75 111 | 81 112 | 97 118 | 102 112 | 101 97 | 98 89 | 90 81 | 57.5 36.9 | 70.6 112.0 | — NR | 1.2 1.5 |
| 50 | 0.75 JS 1.0 CFR2 0.4 D112 0.1 HR5 | RT 197 | 264 149 | 164 98 | 128 81 | 92 61 | 80 54 | 75 59 | 76 63 | 90 64 | 85 67 | 72 55 | 66 52 | 54 47 | 101.0 48.5 | 65.1 51.3 | — NR | 2.3 1.8 |
| 51 | 0.75 JS 1.0 CFR2 0.1 HR5 | RT 197 | 85 158 | 59 132 | 49 129 | 39 116 | 33 113 | 32 112 | 33 116 | 35 84 | 40 74 | 36 65 | 32 65 | 28 62 | 30.9 24.7 | 30.0 116.1 | — NR | 1.6 2.0 |
| 52 | 0.75 JS 1.0 CFR2 0.4 Hal 344 0.1 HR5 | RT 190 | 300+ 195 | 215 154 | 176 143 | 132 124 | 112 117 | 98 118 | 95 126 | 96 137 | 108 137 | 109 128 | 110 115 | 103 97 | 129.9 43.9 | 92.3 118.2 | — NR | 2.0 1.2 |
| 54 | 0.75 JS 1.0 CFR2 0.1 HR5 0.1 Tartaric | RT 190 | 137 48 | 110 37 | 96 31 | 85 29 | 80 29 | 77 29 | 76 29 | 74 26 | 56 19 | 40 13 | 35 10 | 30 10 | 36.3 8.6 | 77.6 28.8 | — NR | 2.8 2.8 |
| 55 | 0.75 JS 1.0 CFR2 0.1 HR5 0.5 Tartaric | RT 190 | 164 63 | 116 44 | 95 45 | 74 39 | 64 36 | 58 33 | 54 31 | 47 22 | 39 15 | 27 10 | 24 9 | 21 7 | 64.4 12.5 | 55.0 35.8 | — NR | 4.3 4.4 |

In the runs, RD, RDS and JS are the grades of LAPONITE synthetic hectorite described above, CFR2 is sodium naphthalene sulfonate,
HR5 is sodium lignosulfonate,
Hal 413 is lignin graft polymer,
D 112 is hydroxy ethyl cellulose,
Hal 344 is AMPS/M copolymer,
HR 12 is calcium lignosulfonate/organic acid blend,
D 134 is an anionic surfactant,
D 600 is a styrene butadiene latex, and
Tartaric is tartaric acid.

CFR2, HR5, Hal 413, Hal 344, and HR12 were obtained from Halliburton Company, while D 112, D 134, and D 600 were obtained from Dowell Schlumberger.

The preparation procedure for Tests 38 and 16 was as follows:

Tests 16 and 38 were made with a prehydrated solution containing 7.41% RDS by weight of solution.

Test 16 was prepared by mixing 772 grams of cement plus 3.86 grams of CFR-2 into 78.14 grams of RDS solution plus 282.77 grams of tap water. 78.14 grams RDS solution=5.79 grams of RDS (0.75% by weight of cement) and 72.59 grams of water, 282.77 grams of tap water+72.59 grams of water from RDS solution=355.36 grams of total water=46% by weight of cement.

Test 38 was prepared from the same RDS solution. 772 grams of cement plus 5.79 grams of CFR-2 was mixed into 282.6 grams of seawater. 72.4 grams of RDS solution was added in the last 15 seconds of the high speed mix cycle. 72.4 grams of RDS solution contains 67.04 grams of fresh water. Therefore, the total mix water=36.61% of seawater (by weight of cement)=8.68% fresh water (by weight of cement).

Test 1 was with "neat" cement, ie. cement which contained no additives.

Tests 2, 5, 6, 20 and 21 demonstrate the effect on viscosity of the addition of 0.5% of various grades of Laponite to the cement blend.

A comparison of Tests 2, 5 and 6 demonstrates the need for adequate yielding of the Laponite before introduction of the cement. In Test 2, the Laponite was added to the mix water and agitated for 2 minutes at 4000 rpm. This did not result in adequate yielding of the Laponite and accordingly, no viscosity increase was evident.

In Test 5, after mixing the Laponite and water mixture was sealed and allowed to stand over a weekend (about 66 hours) before cement addition. The viscosity increase can be seen.

The mixing procedure used for Test 6 was adopted as the standard for the subsequent tests. That procedure calls for use of a well (acid) cleaned 1000 ml Waring blender jar, adding the Laponite to the mix water (typically deionized water), mixing at 4000 rpm within 15 seconds, and then mixing at 12,000 rpm for 35 seconds. Unless otherwise noted, all cement additives, except Laponite, were dry-blended into the cement and thus added concurrently. Some Tests suggest that the yield of the Laponite would be impaired if organic acids were added to the mix water prior to the cement, ie. Tests 27 and 28.

The Laponite should not be dry-blended into the cement as is the usual convention in the U.S. operations; if it is, it will not yield well. The Laponite will yield, if properly yielded in water with little or no dissolved salts. The buffered/retarded grades of Laponite yield better. The manufacturer buffers its products to permit them to yield better in fluids with salts, but they must first be yielded in fresh water. The non-buffered RD Laponite yields relatively quickly in fresh water, but the buffered grades can, in the case of the JS, require more than a month to yield unless an ionic compound is introduced. This would prove beneficial for production of semi-concentrated liquid solutions of Laponite as a liquid additive for cementing. In international and some domestic cementing operations, the use of liquid additives is the norm. The liquid additives are added to the cement mix water just prior to adding cement. A liquid form of Laponite would eliminate the need for extended yield times that would be needed with the RD grade.

These and the subsequent test series, establish a pattern wherein it is evident that increased amounts of phosphate buffering increases cement viscosity. RD has no phosphate buffering, RDS is phosphate buffered, and JS has an even greater amount of phosphate buffering relative to RDS. In several Tests, additional amounts of a phosphate compound were added as additional buffer to the JS formulations with positive benefit.

Tests 1 and 2 used tap water, Test 46 used sea water. Unless otherwise indicated, the remaining Tests used deionized water.

A comparison of Tests 17 and 6 indicates a slight increase in low shear rate viscosity at elevated (125° F.) temperature when a commercial cement dispersant, i.e., Halliburton's CFR-2, a sodium salt of naphthalene sulfonic acid condensed with formaldehyde, is added to the cement formulation. Comparison of Tests 18 and 19 with their respective counterparts, Tests 20 and 21 indicate a similar effect, but it is somewhat more pronounced and evident at room temperature (RT) as well. It is most evident in the "slope" values, wherein slope is defined as the 300 rpm rheometer reading /3 rpm rheometer reading, using a bob and rotating sleeve viscometer with an R1 rotor and B1 bob.

Tests 6, 19, 34 and 35 demonstrate the impact of increasing concentrations of dispersant. At a 0.5% concentration of JS grade Laponite, 0.25% CFR-2 gave the greatest plastic viscosity (PV) and yield point (YP), but 0.5% CFR-2 produced the greatest viscosity at low shear rates; 1.0% CFR-2 reduced PV, YP and low shear viscosity. Thus, 0.5% to 0.75% would be optimum for producing increased YP and slope. Note that increasing yield point, low shear rate viscosity and reduced slope is counter intuitive for application of dispersants. Dispersants typically produce dramatic reductions in yield point, low shear rate viscosity and increase slope. See Tests 1, 8 and 12.

Tests 6, 20, 21, 30 and 67 illustrate that the addition of the different grades of Laponite in themselves do not produce the characteristics of a Flat Rheology cement. It takes a combination of select dispersants with the synthetic hectorite to produce this synergistic response which is further enhanced by the addition of select phosphate compounds, such as tetrasodium pyrophosphate and sodium tripolyphosphate, which are effective to give a relatively high low shear viscosity value.

Tests 9, 10, 11, 13, 14, 15, 23, 24 and 25 further demonstrate marked increases for YP and low shear rate viscosity, reduced PV and dramatic reduction in slope with increasing concentrations of dispersant. The hierarchy of changes continue to favor the more phosphate buffered grades. At the higher concentration of Laponite, no breakback or overtreatment effects from the CFR-2 is noted at the concentrations tested in the low shear values and slope. However, Test 33 does exhibit a somewhat lower YP. This is because the YP is calculated with 300, 200, 100 rheometer values; the lower shear rate values are actually elevated. We may be approaching a point where more CFR-2 will start dispersing the cement slurry at RT and 125° F.

Tests 14, 16, 24 and 38 demonstrate that a solution of buffered/retarded Laponite could be used as a liquid cement additive and the rheology improvements of the Laponite would be retained.

The majority of the remaining tests focus on exploration of the impact of other chemical dispersants, fluid loss additives and cement retarders upon these formulations at further elevated temperatures, particularly the more preferred JS grade. The rheology measurements for these tests were at RT and 160° F. or 197° F., but a few select tests were conditioned at 350° F. to explore the high temperature stability of these reactions or rheological improvements. A problem with many viscosifiers is their instability above ~300° F.

Comparison of Tests 33 and 40 indicates that either the increased temperature or the addition of Halliburton's HR-5 cement retarder provides further rheological enhancement at 160° F. vs 125° F. The cement does exhibit decreased low shear viscosity, YP and increased slope at RT. HR-5 is a highly refined form of sodium lignosulfonate and an effective dispersant. Tests 36 and 40 indicate improved rheological properties with increasing CFR-2 dispersant. Test 40 and 44 are virtually identical, the additional CFR-2 (1.25% total concentration) did not enhance rheology, it appears that we have reached the break-back point for this temperature and formulation.

In Tests 40 and 46, the JS grade is again superior to the RDS.

Tests 39 and 41 illustrate still further improvements by increasing the JS concentration to 1.0% and in Test 41 the CFR-2 concentration is increased to 1.0% as well. The near identical stress values at all shear rates in Test 41 is phenomenal behavior, it is an extreme level of shear thinning with a slope of 1.0. Test 45 shows a decrease in overall viscosity with further increase in CFR-2 dispersant. Although the slope remains at 1.0, this design would provide less viscosity and friction pressure than Test 40.

Test 36 and 37 show that high temperature cement retarders such as Halliburton's HR-12 can be used in these formulations. HR-12 is a mixture of calcium lignosulfonate and an organic acid, such as gluconic acid or glucono delta lactone and is a strong dispersant.

The organic acids could be used for set retardation at extreme temperatures and still retain most of the rheological advantages of the invention, if they were first dry-blended with the cement. However, rheologic properties were much better when the organic acid was used in conjunction with a lignosulfonate. Typically, organic acids are combined with a lignosulfonate for high temperature set retardation.

The tests with different fluid loss additives show that most fluid loss additives will provide a measure of fluid loss control and some additional viscosity. Some were less compatible than others, but further experimentation will be needed to ascertain their true compatibility and ultimate level of fluid loss control. Dowell's D600 latex cement additive and D112, and Halliburton's Hal 344 AMPS/AA co-polymer were most compatible with this invention. The ease of mixing and overall viscosity could be optimized by reducing the concentration of Laponite.

Tests 54 and 55 demonstrate that the Laponite functions well with the combination of HR-5 and tartaric acid for high temperature set retardation while maintaining the desired rheological properties. The rheologic properties listed for 190° F. are for a fluid that has been held at 350° F. for a minimum of 1 hour, and then cooled to 190° F. to facilitate measurement. The RT rheology is before heat-up.

Variance of the runs given in the above table were repeated with the same compositions tested and with additional measurements being recorded. The following Table 2 gives the results obtained with repeated Test Nos. 39, 45, 46, 52 and 71. Except where indicated by an asterisk, the slurries were conditioned for 20 minutes before testing under slow stirring at ambient conditions.

Gel strengths were measured and are reported in Table 2. Measurements were made at slow stirring (3 RPM). The times indicated in seconds are additive, thus the first measurement was made after 2 seconds, the second after an additional 8 seconds (10 seconds total), and so on.

For repeated Test 39, PV and YP were 37.5 cp and 75.5 lb/100 sq.ft. at room temperature where the slurry was tested immediately, and 30.0 cp and 102.0 lb/100 sq.ft. at 160° F.

For repeated Test 45, PV and YP were 39.0 cp and 50.0 lbs/100 sq.ft. at room temperature where the slurry was tested immediately, 30.0 cp and 34.0 lb/100 sq.ft. at room temperature where the slurry was conditioned at slow stirring and ambient conditions for 20 minutes before testing, 16.5 cp and 86.5 lbs/100 sq.ft. at 160° F.

For repeated Test 46, PV and YP were 33.0 cp. and 23.0 lbs/100 sq.ft. at room temperature where the slurry was tested immediately, 28.5 cp and 15.5 lbs/100 sq.ft. at room temperature where the slurry was conditioned at slow stirring and ambient conditions for 20 minutes before testing, 18.0 cp and 20.0 lbs/100 sq.ft. at 160° F.

For repeated Test 52, PV and YP at room temperature were 102 cp and 81.0 lb/100 sq.ft. where the slurry was immediately tested, 125 cp and 47.5 lb/100 sq.ft. at room temperature where the slurry was conditioned at slow stirring and ambient conditions for 20 minutes before testing, 64.5 cp and 74.5 lb/100 sq.ft. at 160° F., and 110 cp and 166.5 lb/100 sq.ft. at 190° F.

For repeated Test 71, PV and YP were 174 cp and 202.0 lbs/100 sq.ft. at room temperature where the slurry was conditioned at slow stirring for 20 minutes at ambient conditions, 33 cp and 239.0 lbs/100 sq.ft. at 190° F.

For repeated Test 39, during conditioning at room temperature the slurry viscosity went from 6.5 to 3.5 Bearden units, and at 160° F. from 8.0 to 12.0 Bearden units.

For repeated Test 45, during conditioning at room temperature the slurry viscosity went from 6.0 to 4.0 Bearden units, and at 160° F. from 4.7 to 11.8 Bearden units.

For repeated Test 46, during conditioning at room temperature the slurry viscosity went from 5.0 to 3.0 Bearden units, and at 160° F. from 4.0 to 2.0 Bearden units.

For repeated Test 52, during conditioning at room temperature the slurry viscosity went from 17.6 to 7.1 Bearden units, at 160° F. from 18.0 to 7.0 Bearden units, and at 190° F. it remained at 17.6 Bearden units.

For repeated Test 71, during conditioning at 190° F., the slurry viscosity went from 22.4 to 18.8 Bearden units

TABLE 2

| Test No. | Temp F | Rheology | | | | | | | | | | | |
|---|---|---|---|---|---|---|---|---|---|---|---|---|---|
| | | 600 | 300 | 200 | 100 | 60 | 30 | 20 | 10 | 6 | 3 | 2 | 1 |
| | | Dial Readings | | | | | | | | | | | |
| 39 | RT* | 143 | 113 | 98 | 88 | 82 | 85 | 88 | 89 | 82 | 70 | 64 | 57 |
| | RT | 116 | 94 | 86 | 74 | 69 | 73 | 73 | 82 | 78 | 63 | | |
| | 160 | 157 | 132 | 120 | 112 | 110 | 108 | 111 | 94 | 88 | 84 | | |
| | | Shear Stress (lbs./sq. ft.) | | | | | | | | | | | |
| | RT* | 1.52 | 1.20 | 1.04 | 0.94 | 0.87 | 0.91 | 0.94 | 0.95 | 0.87 | 0.75 | 0.68 | 0.61 |
| | RT | 1.24 | 1.00 | 0.92 | 0.79 | 0.73 | 0.78 | 0.78 | 0.87 | 0.83 | 0.67 | 0.00 | 0.00 |
| | 160 | 1.67 | 1.41 | 1.28 | 1.19 | 1.17 | 1.15 | 1.18 | 1.00 | 0.94 | 0.89 | 0.00 | 0.00 |
| | | Shear Stress (Pascals) | | | | | | | | | | | |
| | RT* | 72.9 | 57.6 | 50 | 44.9 | 41.8 | 43.3 | 44.9 | 45.4 | 41.8 | 35.7 | 32.6 | 29.1 |
| | RT | 59.2 | 47.9 | 43.9 | 37.7 | 35.2 | 37.2 | 37.2 | 41.8 | 39.8 | 32.1 | 0 | 0 |
| | 160 | 80.1 | 67.3 | 61.2 | 57.1 | 56.1 | 55.1 | 56.6 | 47.9 | 44.9 | 42.8 | 0 | 0 |
| | | Gel Strength @ 3 RPM Seconds | | | | | | | | | | | |
| | | 2 | 8 | 18 | 58 | 120 | 180 | 240 | 300 | | | | |
| | | Readings | | | | | | | | | | | |
| | | 58 | 58 | 61 | 66 | 78 | 84 | 100 | 90 | | | | |
| | 160 | 75 | 66 | 75 | 79 | 85 | 89 | 79 | 81 | | | | |
| | | Shear Stress (lbs./sq. ft.) | | | | | | | | | | | |
| | RT | 0.62 | 0.62 | 0.65 | 0.7 | 0.83 | 0.89 | 1.07 | 0.96 | | | | |
| | 160 | 0.8 | 0.7 | 0.8 | 0.84 | 0.91 | 0.95 | 0.84 | 0.86 | | | | |
| | | Shear Stress (Pascals) | | | | | | | | | | | |
| | RT | 29.6 | 29.6 | 31.1 | 33.7 | 39.8 | 42.8 | 51 | 45.9 | | | | |
| Test39 | 160 | 38.2 | 33.7 | 38.2 | 40.3 | 43.3 | 45.4 | 40.3 | 41.3 | | | | |
| | | Dial Readings | | | | | | | | | | | |
| 45 | RT* | 121 | 89 | 75 | 63 | 57 | 54 | 55 | 61 | 62 | 62 | 62 | 61 |
| | RT | 94 | 64 | 55 | 44 | 39 | 38 | 39 | 41 | 43 | 44 | | |
| | 160 | 125 | 103 | 95 | 92 | 92 | 105 | 125 | 113 | 105 | 94 | | |
| | | Shear Stress (lbs./sq. ft.) | | | | | | | | | | | |
| | RT* | 1.29 | 0.95 | 0.80 | 0.67 | 0.61 | 0.58 | 0.59 | 0.65 | 0.66 | 0.66 | 0.66 | 0.65 |
| | RT | 1.00 | 0.88 | 0.59 | 0.47 | 0.42 | 0.40 | 0.42 | 0.44 | 0.46 | 0.47 | 0.00 | 0.00 |
| | 160 | 1.33 | 1.10 | 1.01 | 0.98 | 0.98 | 1.12 | 1.33 | 1.20 | 1.12 | 1.00 | 0.00 | 0.00 |
| | | Shear Stress (Pascals) | | | | | | | | | | | |
| | RT* | 61.7 | 45.4 | 38.2 | 32.1 | 29.1 | 27.5 | 28 | 31.1 | 31.6 | 31.6 | 31.6 | 31.1 |
| | RT | 47.9 | 32.6 | 28 | 22.4 | 19.9 | 19.4 | 19.9 | 20.9 | 21.9 | 22.4 | | |
| | 160 | 63.7 | 52.5 | 48.4 | 46.9 | 46.9 | 53.5 | 63.7 | 67.6 | 53.5 | 47.9 | | |
| | | Gel Strength @ 3 RPM Seconds | | | | | | | | | | | |
| | | 2 | 8 | 18 | 58 | 120 | 180 | 240 | 300 | | | | |
| | | Readings | | | | | | | | | | | |
| | RT | 42 | 41 | 43 | 49 | 50 | 60 | 72 | 67 | | | | |
| | 160 | 95 | 103 | 107 | 104 | 139 | 144 | 147 | 147 | | | | |
| | | Shear Stress (lbs./sq. ft.) | | | | | | | | | | | |
| | RT | 0.45 | 0.44 | 0.46 | 0.52 | 0.53 | 0.64 | 0.77 | | | 0.71 | | |
| | 160 | 1.01 | 1.1 | 1.14 | 1.11 | 1.48 | 1.53 | 1.57 | | | 1.57 | | |
| | | Shear Stress (Pascals) | | | | | | | | | | | |
| | RT | 21.4 | 20.9 | 21.9 | 25.0 | 25.5 | 30.6 | 36.7 | 34.2 | | | | |
| Test 45 | 160 | 48.4 | 52.5 | 54.6 | 53.0 | 70.9 | 73.4 | 75.0 | 75.0 | | | | |
| | | Dial Readings | | | | | | | | | | | |
| 46 | RT* | 84 | 56 | 46 | 34 | 30 | 27 | 27 | 27 | 28 | 30 | 31 | 30 |
| | RT | 71 | 44 | 35 | 25 | 21 | 18 | 16 | 16 | 17 | 20 | | |
| | 160 | 55 | 38 | 32 | 26 | 24 | 23 | 23 | 25 | 30 | 29 | | |
| | | Shear Stress (lbs./sq. ft.) | | | | | | | | | | | |
| | RT* | 0.9 | 0.6 | 0.5 | 0.4 | 0.3 | 0.3 | 0.3 | 0.3 | 0.3 | 0.3 | 0.3 | 0.3 |
| | RT | 0.8 | 0.5 | 0.4 | 0.3 | 0.2 | 0.2 | 0.2 | 0.2 | 0.2 | 0.2 | 0.0 | 0.0 |
| | 160 | 0.6 | 0.4 | 0.3 | 0.3 | 0.3 | 0.2 | 0.2 | 0.3 | 0.3 | 0.3 | 0.0 | 0.0 |

TABLE 2-continued

| Test No. | Temp F | \multicolumn{12}{c}{Rheology} | | | | | | | | | | | |
|---|---|---|---|---|---|---|---|---|---|---|---|---|---|
| | | 600 | 300 | 200 | 100 | 60 | 30 | 20 | 10 | 6 | 3 | 2 | 1 |

Shear Stress (Pascals)

| | | 600 | 300 | 200 | 100 | 60 | 30 | 20 | 10 | 6 | 3 | 2 | 1 |
|---|---|---|---|---|---|---|---|---|---|---|---|---|---|
| | RT* | 42.8 | 28.6 | 23.5 | 17.3 | 15.3 | 13.8 | 13.8 | 13.8 | 14.3 | 15.3 | 15.8 | 15.3 |
| | RT | 36.2 | 22.4 | 17.8 | 12.7 | 10.7 | 9.18 | 8.16 | 8.16 | 8.67 | 10.2 | 0 | 0 |
| | 160 | 28 | 19.4 | 16.3 | 13.3 | 12.2 | 11.7 | 11.7 | 12.7 | 15.3 | 14.8 | 0 | 0 |

Gel Strength @ 3 RPM
Seconds

| | | 2 | 8 | 18 | 58 | 120 | 180 | 240 | 300 |
|---|---|---|---|---|---|---|---|---|---|

Readings

| | RT | 21 | 28 | 29 | 31 | 31 | 28 | 43 | 47 |
|---|---|---|---|---|---|---|---|---|---|
| | 160 | 30 | 31 | 32 | 36 | 40 | 44 | 52 | 53 |

Shear Stress (lbs./sq. ft.)

| | RT | 0.22 | 0.3 | 0.31 | 0.33 | 0.33 | 0.3 | 0.46 | 0.5 |
|---|---|---|---|---|---|---|---|---|---|
| | 160 | 0.32 | 0.33 | 0.34 | 0.38 | 0.43 | 0.47 | 0.55 | 0.56 |

Shear Stress (Pascals)

| | RT | 10.7 | 14.3 | 14.8 | 15.8 | 15.8 | 14.3 | 21.9 | 24.0 |
|---|---|---|---|---|---|---|---|---|---|
| | 160 | 15.3 | 15.8 | 16.3 | 18.4 | 20.4 | 22.4 | 26.5 | 27.0 |

Test 46

Dial Readings

| Test No. | Temp F | 600 | 300 | 200 | 100 | 60 | 30 | 20 | 10 | 6 | 3 | 2 | 1 |
|---|---|---|---|---|---|---|---|---|---|---|---|---|---|
| 52 | RT* | 270 | 183 | 153 | 115 | 99 | 88 | 88 | 92 | 108 | 107 | 105 | 101 |
| | RT | 277 | 172 | 133 | 89 | 71 | 57 | 52 | 48 | 48 | 53 | | |
| | 160 | 192 | 139 | 119 | 96 | 87 | 86 | 92 | 104 | 108 | 107 | | |
| | 190 | 300+ | 276 | 244 | 203 | 178 | 156 | 139 | 133 | 128 | 113 | | |

Shear Stress (lbs./sq. ft.)

| | RT* | 2.88 | 1.95 | 1.63 | 1.22 | 1.05 | 0.94 | 0.94 | 0.98 | 1.15 | 1.14 | 1.12 | 1.08 |
|---|---|---|---|---|---|---|---|---|---|---|---|---|---|
| | RT | 2.95 | 1.83 | 1.42 | 0.95 | 0.76 | 0.61 | 0.55 | 0.51 | 0.51 | 0.56 | 0.00 | 0.00 |
| | 160 | 2.04 | 1.48 | 1.27 | 1.02 | 0.93 | 0.92 | 0.98 | 1.11 | 1.15 | 1.14 | 0.00 | 0.00 |
| | 190 | | 2.94 | 2.60 | 2.16 | 1.90 | 1.66 | 1.48 | 1.42 | 1.36 | 1.20 | 0.00 | 0.00 |

Shear Stress (Pascals)

| | RT* | 138 | 93.3 | 78 | 58.6 | 50.5 | 44.9 | 44.9 | 46.9 | 55.1 | 54.6 | 53.5 | 51.5 |
|---|---|---|---|---|---|---|---|---|---|---|---|---|---|
| | RT | 141 | 87.7 | 67.8 | 45.4 | 36.2 | 29.1 | 26.5 | 24.5 | 24.5 | 27 | 0 | 0 |
| | 160 | 97.9 | 70.9 | 60.7 | 49 | 44.4 | 43.9 | 46.9 | 53 | 55.1 | 54.6 | 0 | 0 |
| | 190 | | 141 | 124 | 104 | 90.8 | 79.5 | 70.9 | 67.8 | 65.3 | 57.6 | 0 | 0 |

Gel Strength @ 3 RPM
Seconds

| | | 2 | 8 | 18 | 58 | 120 | 180 | 240 | 300 |
|---|---|---|---|---|---|---|---|---|---|

Readings

| | RT | 89 | 98 | 105 | 112 | 117 | 124 | 135 | 143 |
|---|---|---|---|---|---|---|---|---|---|
| | 160 | 100 | 100 | 102 | 91 | 105 | 119 | 116 | 123 |
| | 190 | 112 | 112 | 109 | 111 | 113 | 115 | 124 | 128 |

Shear Stress (lbs./sq. ft.)

| | RT | 0.95 | 1.04 | 1.12 | 1.19 | 1.25 | 1.32 | 1.44 | 1.52 |
|---|---|---|---|---|---|---|---|---|---|
| 52 | 160 | 1.07 | 1.07 | 1.09 | 0.97 | 1.12 | 1.27 | 1.24 | 1.31 |
| | 190 | 1.19 | 1.19 | 1.16 | 1.18 | 1.2 | 1.22 | 1.32 | 1.36 |

Shear Stress (Pascals)

| | RT | 45.4 | 50 | 53.5 | 57.1 | 59.7 | 63.2 | 68.8 | 72.9 |
|---|---|---|---|---|---|---|---|---|---|
| | 160 | 51 | 51 | 52 | 46.4 | 53.5 | 60.7 | 59.2 | 62.7 |
| | 190 | 57.1 | 57.1 | 55.6 | 56.6 | 57.6 | 58.6 | 63.2 | 65.3 |

Test 52

Dial Readings

| Test No. | Temp F | 600 | 300 | 200 | 100 | 60 | 30 | 20 | 10 | 6 | 3 | 2 | 1 |
|---|---|---|---|---|---|---|---|---|---|---|---|---|---|
| 71 | RT* | 510 | 376 | 320 | 260 | 236 | 220 | 228 | 246 | 270 | | 246 | |
| | 190 | 284 | 272 | 252 | 250 | 270 | 278 | 306 | 298 | 250 | | 234 | |

Shear Stress (lbs./sq. ft.)

| | RT* | 5.43 | 4.00 | 3.41 | 2.77 | 2.51 | 2.34 | 2.43 | 2.62 | 2.88 | | 2.62 | |
|---|---|---|---|---|---|---|---|---|---|---|---|---|---|
| | 190 | 3.02 | 2.90 | 2.68 | 2.66 | 2.88 | 2.96 | 3.26 | 3.17 | 2.66 | | 2.49 | |

Shear Stress (Pascals)

| | RT* | 260 | 192 | 163 | 133 | 120 | 112 | 116 | 125 | 138 | | 125 | |
|---|---|---|---|---|---|---|---|---|---|---|---|---|---|
| | 190 | 145 | 139 | 129 | 127 | 138 | 142 | 156 | 152 | 127 | | 119 | |

TABLE 2-continued

| Test No. | Temp F | 600 | 300 | 200 | 100 | 60 | 30 | 20 | 10 | 6 | 3 | 2 | 1 |
|---|---|---|---|---|---|---|---|---|---|---|---|---|---|
| | | Gel Strength @ 3 RPM Seconds | | | | | | | | | | | |
| | | 2 | 8 | 18 | 58 | 120 | 180 | 240 | 300 | | | | |
| | | Readings | | | | | | | | | | | |
| | RT* | 10s | 228 | | 10m | 250 | | | | | | | |
| | 190 | 190 | 190 | | 212 | 230 | 250 | 258 | 266 | | | | |
| | | Shear Stress (lbs./sq. ft.) | | | | | | | | | | | |
| | RT* | | 2.43 | | | 2.66 | | | | | | | |
| | 190 | 2.02 | 2.02 | 0 | 2.26 | 2.45 | 2.66 | 2.75 | 2.83 | | | | |
| | | Shear Stress (Pascals) | | | | | | | | | | | |
| | RT* | | 116 | | 127 | | | | | | | | |
| Test71 | 190 | 97 | 97 | | 108 | 117 | 127 | 132 | 136 | | | | |

In accordance with the invention, it is possible to form slurries which have essentially flat rheology curves. For example, for Run 71 at 190° F. as reported above in Table 2 the following data are obtained.

TABLE 3

| RMP | Readings | Shear Rate 1/sec | Shear Stress lbs/sq ft | Pascals | Predicted Shear Stress lbs/sq ft |
|---|---|---|---|---|---|
| 600 | 284 | 1021.38 | 3.02 | 145 | 2.73 |
| 300 | 272 | 510.69 | 2.90 | 139 | 2.78 |
| 200 | 252 | 340.46 | 2.68 | 129 | 2.80 |
| 100 | 250 | 170.23 | 2.66 | 127 | 2.82 |
| 60 | 270 | 102.14 | 2.88 | 138 | 2.83 |
| 30 | 278 | 51.07 | 2.96 | 142 | 2.84 |
| 20 | 306 | 34.05 | 3.26 | 156 | 2.84 |
| 10 | 298 | 17.02 | 3.17 | 152 | 2.84 |
| 6 | 250 | 10.21 | 2.66 | 127 | 2.84 |
| 3 | 234 | 5.11 | 2.49 | 119 | 2.84 |

FIGS. 1 and 2 are graphs of the above Shear Stress in lb/sq.ft. versus Shear Rate in 1/sec and demonstrate the flat curves which can be achieved in accordance with the invention, FIG. 2 being a logarithmic plot, and FIG. 1 a linear plot of the data.

Standard calculation methods were used and it can be seen from FIG. 1 that the slurry exhibited Bingham plastic behavior, and from FIG. 2 Power Law behavior.

The addition of synthetic hectorite clay to a normal cement slurry adds thixotropic behavior, including rapid and reversible gel strength development. These properties are particularly useful for controlling last circulation in oil field drilling operations. The rapid and extreme gelling properties immobilizes the cement when it is allowed to remain static for even short periods.

In a primary cementing operation it can be more advantageous to employ a formulation which incorporates the synergistic properties gained by optimized combinations of synthetic hectorite with chemical dispersants and/or select phosphates, as mentioned above. The addition of the dispersants and/or phosphate flattens the rheologic profile of the cement slurry by boosting the low shear rate viscosity in relation to the high shear rate viscosity. The high viscosity at low shear rates is present under dynamic conditions and is therefore not dependent upon being static to reduce loses to weak formations, ie, lost circulation. Thixotropic cements require that the cement must first stop moving before the losses can be stopped, a difficult feat when gravity is present during the losses.

In primary cementing, cessation of pumping during cement placement can occur due to mechanical problems, standard placement procedures, and "free fall" dynamics. In these situations thixotropic cements that exhibit extreme progressive gel development can be detrimental. While the gels are reversible, the gel strength must be first overcome before the gelation can be reversed. A long column of high annular surface area cement which has been allowed to become static and thus has strongly gelled, cannot generally be restarted. If the placement procedure cannot be resumed, a catastrophic failure results. A synergistic blend of synthetic hectorite, chemical dispersant and/or phosphate as disclosed herein is better suited for these applications. The high low shear viscosity limits pressure losses through high surface area fracture propagation under both dynamic and static conditions. These designs do not exhibit progressive gels. The static gel strength is the same as the dynamic viscosity, but the high low shear rate viscosity is low enough to permit placement.

The flat rheology profile also enhances mud displacement by reducing the disparity in flow velocity across an eccentric annulus. It also increases displacement efficiency at low shear rates since a flat rheology cement exhibits a higher viscosity that the drilling fluids at these low shear rates.

In the above-mentioned synergistic compositions of the invention, examples of suitable chemical dispersants used with the synthetic hectorite clay include sodium naphthalene sulfonate condensed with formaldehyde, lignosulfonate salts, i.e., the calcium, sodium, phosphorous, zirconium, and chromium forms thereof, organic acids, i.e., gluco-delta-lactone, Na-EDTA, citric acid, tartaric acid, calcium and sodium gluco heptanate, erythorbic acid, sodium sulfonated maleic anhydride, sulfonated acetone condensed with formaldehyde, polyacrylates, sulfonated tannins, acrylate/acrylamide copolymers, sulfonated vinyl benzoyl/acrylate copolymers, sulfonated vinyl toluene maleic anhydride copolymers, AMPS, interpolymers of acrylic acid, allyloxy-benzene sulfonate, allyl sulfonate and non-ionic monomers. The chemical dispersant is generally used in an amount of from about 0.5 to 4 wt % based on the weight of cement.

In the above-mentioned synergistic compositions of the invention, suitable phosphate compounds used with the synthetic hectorite clay are those which are effective to produce a relatively flat rheology curve, the 300/3 slope of which is 4 or less, as illustrated by FIGS. 1 and 2 herein. Examples of such phosphate compounds are tetrasodium pyrophosphate and sodium tripolyphosphate. The phosphate compound is generally used in an amount effective to produce the desired relatively flat rheological curve, generally from about 0.001 to 2 wt % based on the weight of cement.

The synthetic hectorite clay is used in an amount as previously described herein.

Other embodiments of the invention will become apparent to one skilled in the art upon reading the disclosure provided herein. Furthermore, the specific examples of the invention as described hereinabove are intended to merely illustrate the invention and not to limit the scope of the claims appended hereto.

We claim:

1. A cement slurry composition useful for cementing oil wells comprising cement and water together with an amount of synthetic hectorite clay sufficient to reduce solids segregation and free water development.

2. The composition of claim 1 wherein the synthetic hectorite clay has the composition by weight on a dry basis of 59.5% $SiO_2$, 27.5% MgO. 0.8% $Li_2O$, and 2.8% $Na_2O$.

3. The composition of claim 1 wherein the synthetic hectorite has the composition by weight on a dry basis of 54.5% $SiO_2$, 26.0% MgO, 0.8% $Li_2O$, 5.6% $Na_2O$ and 4.1% $P_2O_5$.

4. The composition of claim 1 wherein the synthetic hectorite has the composition by weight on a dry basis of 54.5% $SiO_2$, 26.0 MgO, 0.8% $Li_2O$, 5.6% $Na_2O$, 4.1% $P_2O_5$, and also contains inorganic polyphosyhate peptizers.

5. The composition of claim 1 characterized by a ratio of shear stress at 300 rpm to shear stress at 3 rpm of 4 or less.

6. A settable thixotropic material comprising a synthetic hectorite clay and a settable cementitious substance, the material containing said hectorite clay in an amount sufficient to provide a reversible gelling time of less than 60 seconds.

7. A material according to claim 6 having a gelling time of less than 30 seconds.

8. A material according to claim 6 having a gelling time of less than 10 seconds.

9. A material according to claim 6 wherein the thixotrope is a synthetic hectorite clay and the settable substance is Portland cement.

10. A slurry composition comprising cement and water together with synthetic hectorite clay in an amount sufficient to provide said composition with a rheological shear stress versus shear rate curve which is flat.

11. The slurry composition of claim 10, wherein the hectorite has the composition by weight on a dry basis of (a) 59.5% $SiO_2$, 27.5% MgO, 0.8% $Li_2O$, and 2.8% $Na_2O$, (b) 54.5% $SiO_2$, 26.0% MgO, 0.8% $Li_2O$, 5.6% $Na_2O$ and 4.1% $P_2O_5$, or (c) 54.5% $SiO_2$, 26.0% MgO, 0.8% $Li_2O$, 5.6% $Na_2O$, 4.1% $P_2O_5$ and with inorganic polyphosphate peptizers.

12. A cement slurry composition comprised of cement and water, and also containing a synergistic combination comprised of a synthetic hectorite and at least one additive selected from the group consisting of (a) sodium naphthalene sulfonate condensed with formaldehyde; calcium, sodium, phosphorous, zirconium, or chromium lignosulfonate salts; gluco-delta-lactone; Na-ethylenediamine tetra acetic acid; citric acid; tartaric acid; calcium and sodium gluco heptanate; erythorbic acid; sodium sulfonated maleic anhydride; sulfonated acetone condensed with formaldehyde; polyacrylates; sulfonated tannins; acrylate/acrylamide copolymers; acrylomido methyl propane sulfonate copolymers; interpolymers of acrylic acid; allyloxybenzene sulfonate; allyl sulfonate and non-ionic monomers; and (b) tetrasodium pyrophosphate or sodium tripolyphosphate in amounts sufficient to substantially increase low shear viscosity and produce a rheology curve characterized by a ratio of shear stress at 300 rpm to shear stress at 3 rpm of 4 or less.

13. The composition of claim 12 wherein the additive (b) is present in an amount from about 0.001 to 2 wt % based on the weight of cement.

14. The composition of claim 12 wherein the additive (a) is present in an amount from about 0.5 to 4 wt % based on weight of the cement.

15. The composition of claim 12 wherein the synthetic hectorite is present in an amount from 0.1 to 4 wt % based on weight of the cement.

* * * * *